March 19, 1968  LE ROY R. BOGGS  3,374,132
METHOD AND APPARATUS FOR MAKING FIBER REINFORCED
ARTICLES OF CROSS SECTIONAL SHAPE
OTHER THAN CYLINDRICAL
Filed Jan. 22, 1965

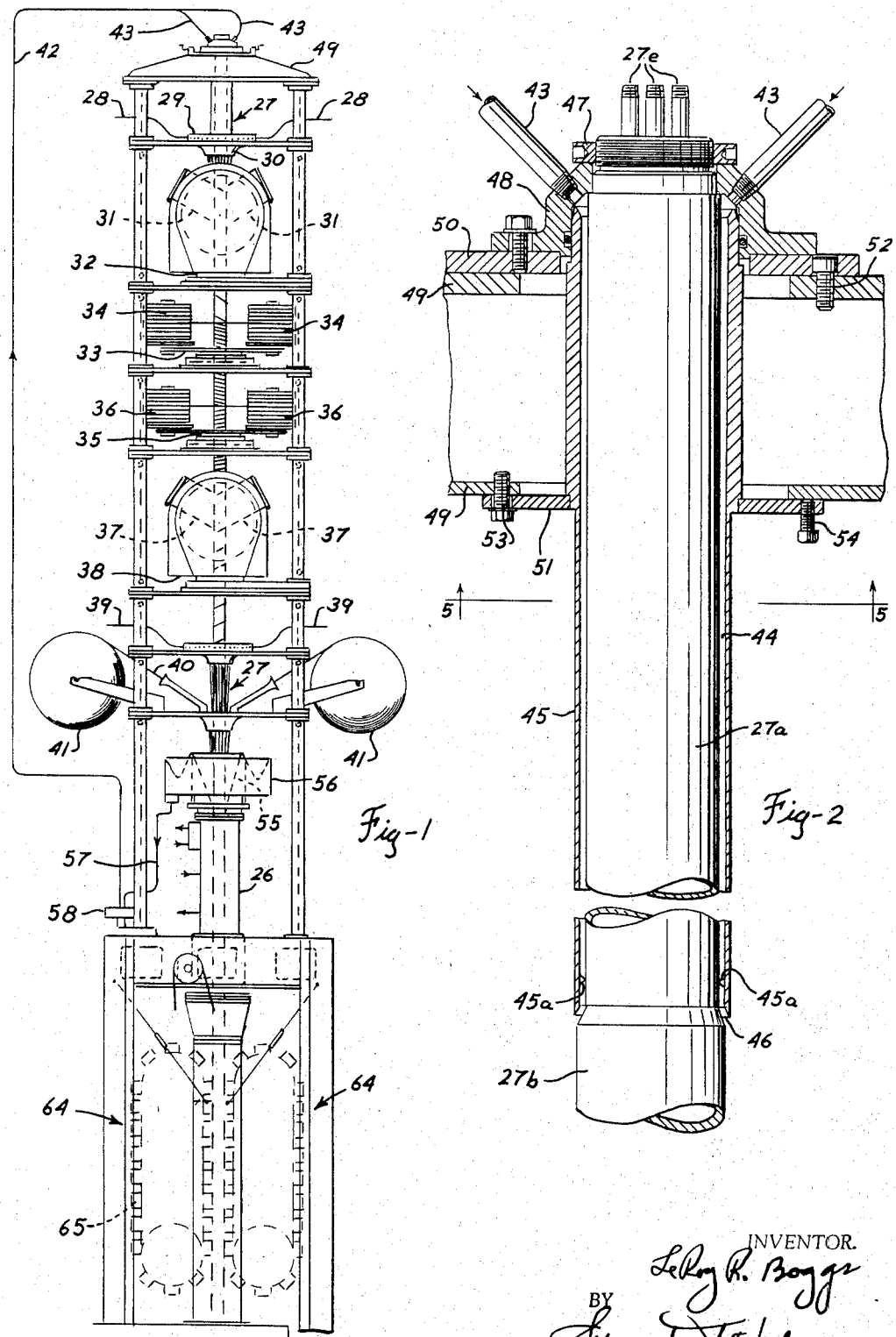

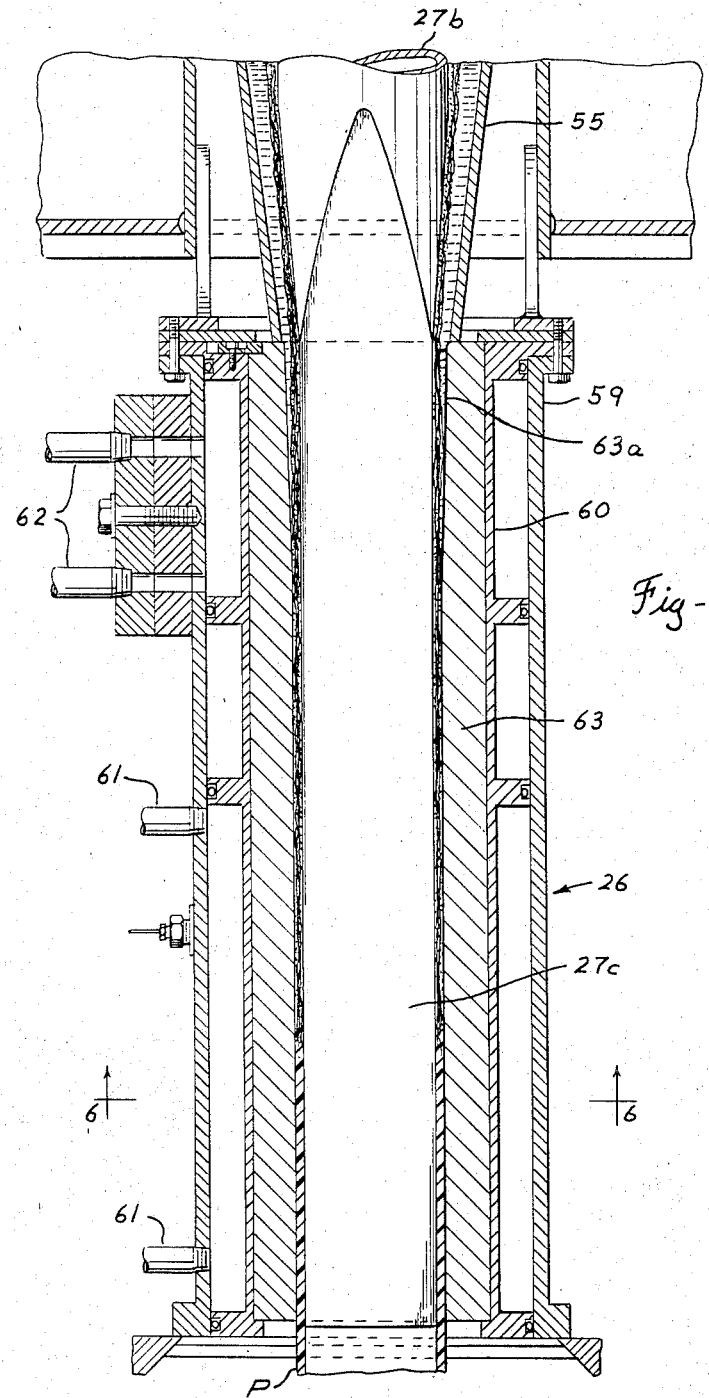

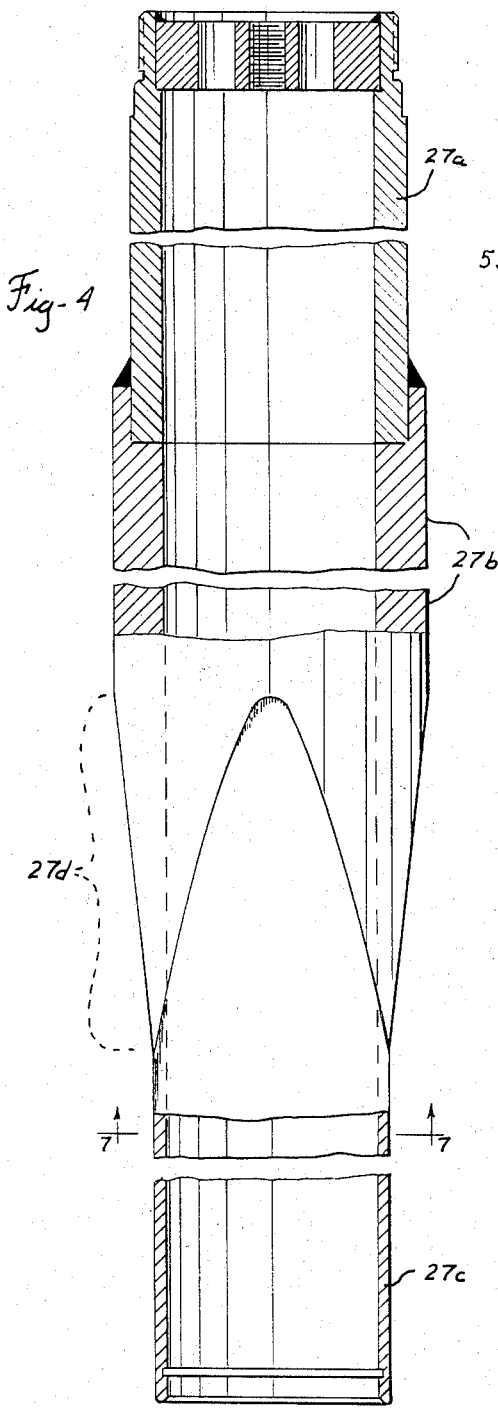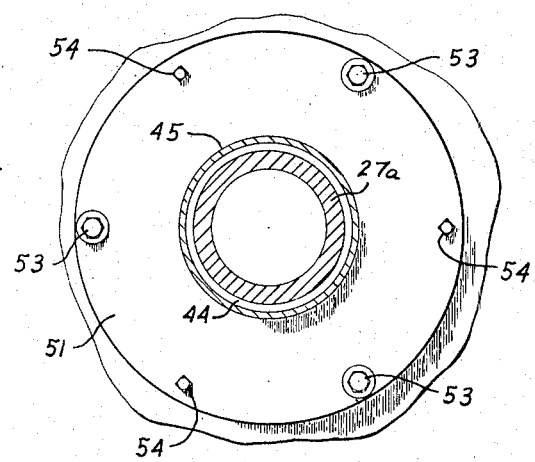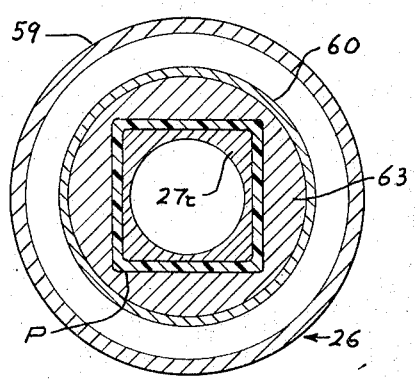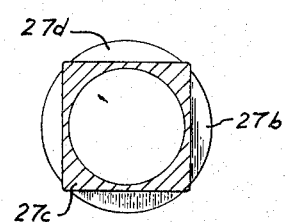

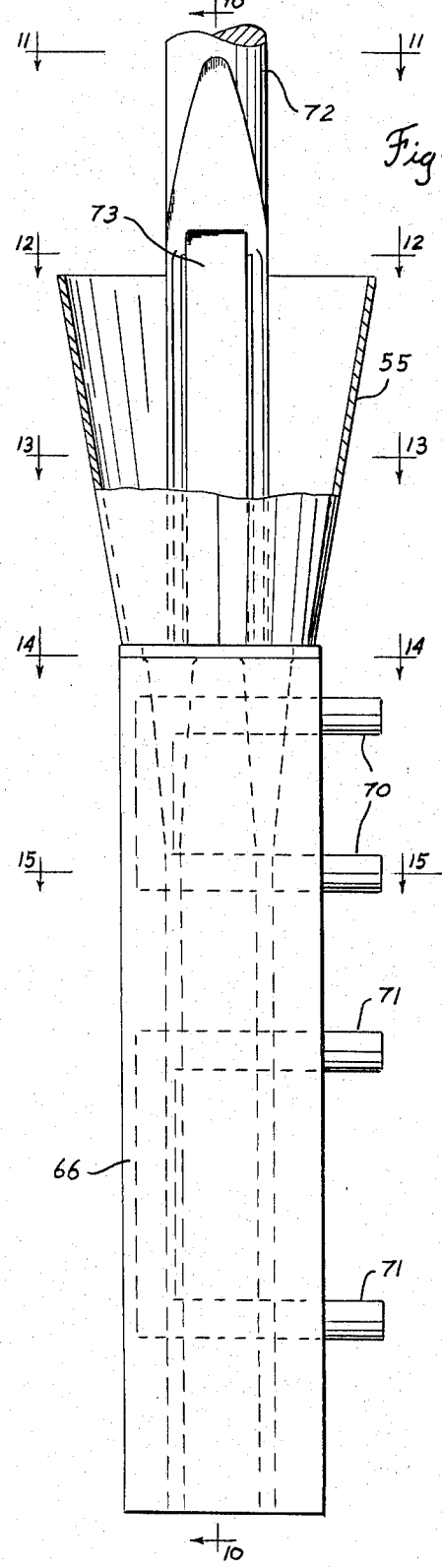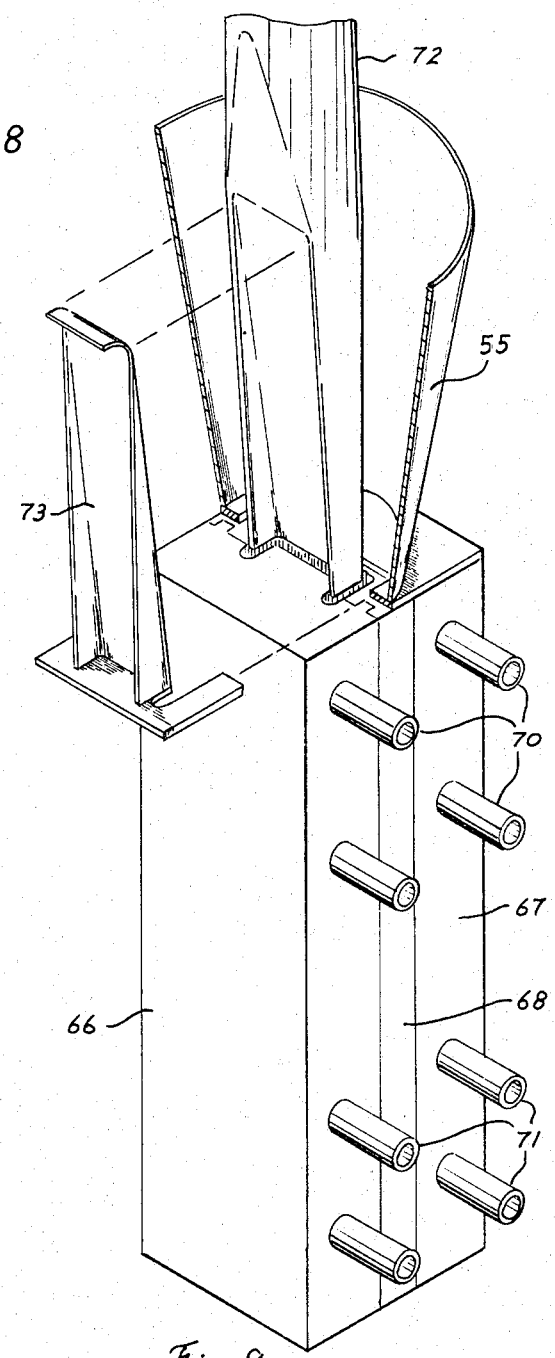

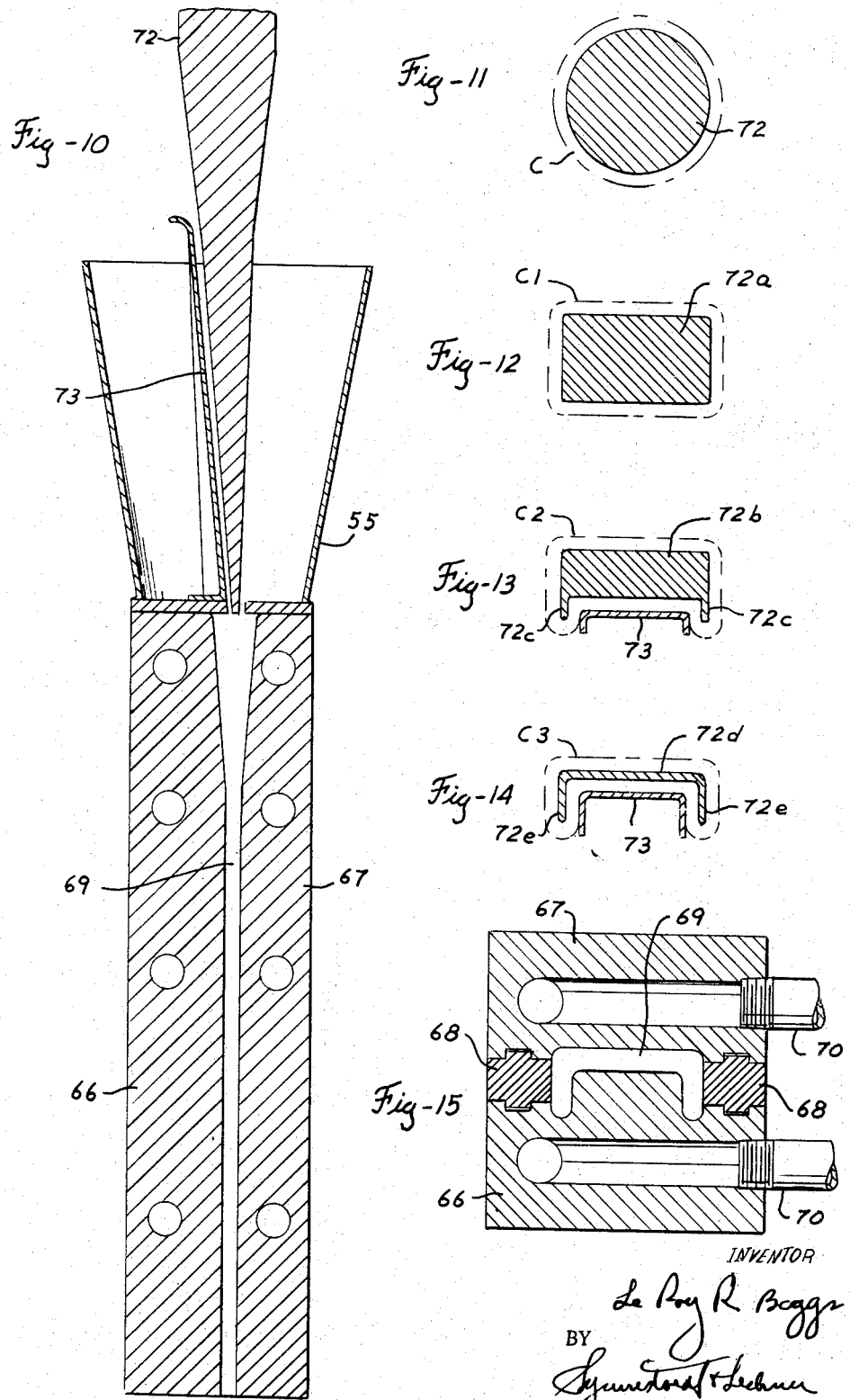

INVENTOR.
Le Roy R. Boggs
BY
AT TORNEYS

United States Patent Office 3,374,132
Patented Mar. 19, 1968

3,374,132
METHOD AND APPARATUS FOR MAKING FIBER REINFORCED ARTICLES OF CROSS SECTIONAL SHAPE OTHER THAN CYLINDRICAL
Le Roy R. Boggs, Bristol, Tenn., assignor, by mesne assignments, to Koppers Company, Inc., Pittsburgh, Pa., a corporation of Delaware
Filed Jan. 22, 1965, Ser. No. 427,312
8 Claims. (Cl. 156—171)

ABSTRACT OF THE DISCLOSURE

Equipment and method to produce continuous lengths of tubular resin articles, having a cross sectional shape other than circular, includes a core on which longitudinal as well as transverse reinforcing filaments are arranged. The core has a first cylindrical portion and a second transition portion that merges with a third portion having the shape of the desired cross section. The peripheral lengths of the cross sections of the first cylindrical, the second transitional and the third final shape portion are substantially equal. A filament winding mechanism and an article pulling mechanism are associated with the apparatus.

---

This invention relates to the production of fiber reinforced resin articles and is particularly concerned with a method and apparatus for making fiber reinforced articles of cross sectional shape other than cylindrical, for instance an article of square or angular shape, either tubular or solid, or articles such as channel members, angle pieces and I-beams.

One of the principal objectives of the invention is to provide a method and equipment by which articles of the kind referred to may be produced in continuous lengths, by the feed or supply of elongated reinforcement elements, for instance rovings or strips of fibrous material, while at the same time providing for disposition of such reinforcement elements or various fibers thereof not only lengthwise of the elongated article being made but also in directions transverse the length of the articles being made. In this way, an article, such for example as an I-beam, will have reinforcement fibers oriented therein both lengthwise of the I-beam and also transversely of the length of the I-beam, including transversely of the web and of the flanges of the I-beam. As another example, in accordance with the invention an angular, for instance a square tube, may be provided having reinforcement fibers oriented not only lengthwise of the tube but also transversely thereof in the several relatively angled portions of the tube wall.

Although it may be possible by certain types of hand lay-up operations to achieve the reinforcement fiber orientations contemplated by the present invention, it has not been practicable to do this in a continuous type of operation in which the article is progressively made in pieces of any desired length. By continuous, as here referred to, it is not intended to mean only an operation which is conducted continuously and steadily as a matter of time, but also any operation which forms continuous lengths of the article being made, even though there may be periodic or irregular interruptions in the production operation.

How the foregoing very generally stated objects and advantages are attained, together with others which are pointed out hereinafter or which will occur to those skilled in the art will be clear from the following description referring to the accompanying drawings in which—

FIGURE 1 is an overall generally horizontal outline view of an apparatus constructed in accordance with the present invention and adapted to produce continuous lengths of a substantially square tube;

FIGURE 2 is a vertical sectional view on an enlarged scale of one portion of the equipment employed in accordance with the present invention, the view showing an upper part of the apparatus of FIGURE 1;

FIGURE 3 is a vertical sectional view on the scale of FIGURE 2 showing another portion of the equipment employed in accordance with the present invention, the view illustrating a lower central part of FIGURE 1;

FIGURE 4 is a view on a still further enlarged scale of a reinforcement forming structure used in the apparatus of FIGURE 1, with parts broken out;

FIGURE 5 is a transverse sectional view taken as indicated by the line 5—5 on FIGURE 2 and on the scale of FIGURES 2 and 3;

FIGURE 6 is a transverse sectional view taken as indicated by the line 6—6 on FIGURE 3 and on the scale of FIGURES 2 and 3;

FIGURE 7 is a transverse sectional view taken as indicated by the line 7—7 on FIGURE 4 but on the same scale as FIGURES 5 and 6;

FIGURE 8 is a fragmentary elevational view of a modification of the equipment of the invention adapted to the production of a channel member instead of to the production of a square tube, as in FIGURES 1 to 7;

FIGURE 9 is a view of portions of the equipment of FIGURE 8 but shown in perspective and with certain parts relatively separated so as to clearly illustrate the construction and arrangement thereof;

FIGURE 10 is a vertical sectional view taken as indicated by the section line 10—10 on FIGURE 8;

Figure 21:
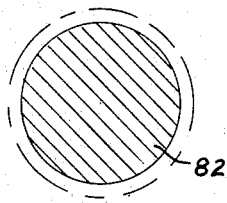
Figure 16:
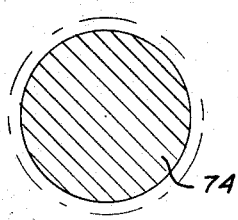
Figure 22:
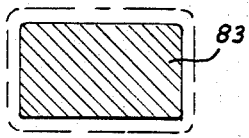
Figure 17:
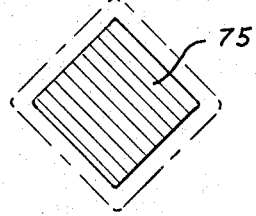
Figure 23:
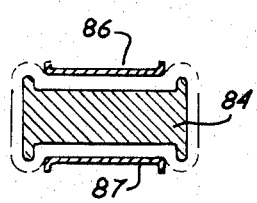

FIGURES 11 to 15 inclusive are transverse or horizontal sectional views taken substantially as indicated by the sections lines 11—11 to 15—15 on FIGURE 8, but on an enlarged scale as compared with FIGURE 8;

FIGURES 16 to 20 inclusive are views similar to FIGURES 11 to 15 inclusive but illustrating another modification of the equipment according to the invention, this equipment being adapted to the production of an angle piece; and FIGURES 21 to 25 inclusive are views similar to FIGURES 11 to 15 inclusive but illustrating still another modification, in this instance the equipment being adapted to the production of an I-beam.

Certain features of the general arrangement of the apparatus as shown in FIGURE 1 are similar to the equipment of my copending application Ser. No. 299,636, filed Aug. 2, 1963, now Patent 3,306,797, and for that reason certain of the details will not be described herein, as reference may be had to that copending application. However, the general arrangement and operation of the apparatus as shown in FIGURE 1 is described as follows.

In the lower central portion of the figure a forming device 26 is provided, this device having a forming passage extended generally vertically therethrough in which there is a core cooperating therewith to provide a passage of cross sectional shape substantially conforming with that of the tubular article being made. The core comprises the lower part or a lower extension of a mechanism for shaping and guiding fibrous reinforcements to be fed into the forming passage. In FIGURE 1 this structure is generally indicated by the numeral 27. The details of the construction and shape of various parts of the structure 27 and also of the core extension thereof will be more fully developed herebelow with reference to other figures. Here, however, it is to be noted that as shown in FIGURE 1 various reinforcement elements are laid upon the structure 27 and fed downwardly on the surface of that structure into the forming passage in the device 26. As seen toward the top of FIGURE 1 a series of rovings 28 are brought radially inwardly from suitable sources of a supply (not shown) and are passed through radial apertures in the guide plate 29, from which they are delivered in a layer or ply through the funnel 30 to the external surface of the structure 27.

Fibrous strips such as indicated at 31 are helically wound upon the ply of rovings 28, these strips constituting a second ply of reinforcements. The strips 31 may be supplied from appropriate spools carried by a turntable 32 rotative about the axis of the structure 27. Since the reinforcements are being advanced downwardly on the surface of the structure 27 during the winding of the strips 31, the strips are thereby helically wound upon the structure 27. Similarly at a station below the turntable 32, another turntable 33 is provided, this turntable serving to carry spools 34 of rovings which are also wound upon the structure 27 on top of the strips 31, these rovings also being laid down in helical fashion. In the next subjacent station a turntable 35 carries additional roving spools 36 and this turntable is adapted to rotate in the opposite direction to the turntable 33 so as to provide a helically wound layer or ply of rovings of opposite hand.

Additional fibrous strips 37 are next wound in helical fashion on top of the rovings just referred to, this being accomplished by rotation of a turntable 38 carrying appropriate supply spools for the strips 37.

The next ply of reinforcements delivered comprises an additional series of rovings 39 brought in radially and fed axially to the structure 27 in a manner similar to the series of rovings 28 described above.

A final or outside ply or layer of reinforcements is delivered to the structure 27 in the form of fibrous strips 40 supplied from spools 41, these strips being laid upon the structure 27 in an axial direction at a point shortly above the forming device 26.

It should be understood that the plies of reinforcements may be differently arranged according to the specific reinforcement needs of the particular article being made. For instance, the sequence of applying rovings, strips, etc., may be changed. Also some may be omitted or others may be added, if desired, such changes being provided for in the manner disclosed in the copending application above referred to.

As in the copending application above referred to, it is also contemplated that the various layers or plies of reinforcements shall be impregnated with liquid heat hardenable resin material, and this is accomplished by delivery of such a resin material through the supply line 42 and the branch pipes 43 (see FIGURE 2) to the annular passage 44 provided between the uppermost portion 27a of the structure 27 and a surrounding sleeve 45. The lower end of the annular passage 44 terminates in an annular orifice 46 from which the liquid resin material is distributed over the external surface of the intermediate portion 27b of the structure 27. Concentricity of the sleeve 45 and the structure 27a is provided for by spaced positioning elements 45a, in the form of three or four small protuberances on the inside surface of the sleeve 45.

As seen in FIGURES 1, 2 and 5, the structure 27 is supported at its upper end by means of a nut 47 threaded onto the upper end of the part 27a and resting upon a fitting 48 which in turn is carried by the cap 49 of the tower structure shown in FIGURE 1 by means of which the various parts of the apparatus are mounted. The sleeve 45 is also mounted on the cap 49 through the intermediation of upper and lower plates 50 and 51. The plate 50 is secured to the cap 49 by means of studs one of which is indicated at 52 in FIGURE 2. The plate 51 carries the sleeve 45, the plate 51 being secured to a part of the cap 49 by means of a series of three studs 53 (see FIGURES 2 and 5). Three additional studs 54 alternating in position with the studs 53 around the plate 51 serve to adjust the spacing of the plate 51 with reference to the cap 49, the studs 53 serving to tighten the connection in any adjusted position. Since the sleeve 45 is suspended from the plate 51 this arrangement provides for vertical adjustment of the sleeve 45 with respect to the portion 27a of the structure 27. In this way the size of the annular orifice 46 may be adjusted in order to control the amount of resin flow and thus the amount of resin delivered to the surface of the portion 27b of the structure 27.

This arrangement of the sleeve 45 and its manner of association with the structure 27 provides an effective system for uniformly distributing the resin circumferentially over the surface of the portion 27b of the structure 27 and this is of importance in insuring uniform impregnation of all of the plies or layers of the reinforcements which are laid upon or wound upon the structure 27.

As brought out in the copending application above referred to it is contemplated that an excess of resin (a quantity in excess of that required to impregnate all of the fibrous reinforcement and fill up the forming passage) shall be delivered to the portion 27b of the structure 27, which excess will accumulate in the reservoir or pan 55 (see FIGURE 1) and will overflow therefrom into the annular chamber 56, from which it will be delivered through the connection 57 to a pump 58 which serves to feed resin into the supply line 42 above referred to.

Particular attention is now called to the fact that the portion 27b of the structure 27 is cylindrical in form (see FIGURES 4 and 7) whereas the portion 27c (see FIGURES 3, 4, 6 and 7), is of angular cross section, in this instance square so as to cooperate with a square passage in the forming device 26 and thus provide for the formation of a tubular article of square cross section. As seen in FIGURES 3 and 4, there is a transition zone between the cylindrical portion 27b and the portion 27c, this transition zone being indicated in FIGURE 4 by the bracket 27d. The transition zone also appears in FIGURE 7 at 27d. In accordance with the preferred arrangement, the perimeter or peripheral measurement of the squart part 27c is substantially the same as the circumference of the cylindrical part 27b. In addition it is preferred that at each progressive section throughout the transition portion 27d, approximately the same peripheral measurement be retained. In this way, as the reinforcement envelope is advanced along the shaping and guiding structure 27, there is no tendency for the reinforcements either to be enlarged or to slacken.

From FIGURES 3 and 6, it will be seen that the forming device 26 comprises an outer shell or jacket 59 and an inner shell 60 cooperating to provide a space therebetween which is divided into portions or sections axially of the structure, thereby providing for the flow of heat transfer media through the device 26. Specifically it is contemplated that a heating medium shall be circulated through the lowermost portion of the interspace between the shells 59 and 60 by means of connections 61, this heating medium serving to raise the temperature of the resin as it passes through the forming passage, thereby solidifying the resin. Near the upper or entrance end of the forming device 26, the uppermost section of the interspace between the sleeves 59 and 60 is supplied with a cooling medium through the connections 62, this being of importance in order to retain the liquid heat hardenable resin material at a temperature below the solidification temperature and in order also to insulate or isolate the resin in the resin reservoir 55 from the zone of heating, and in this way prevent undesirable or premature curing of any appreciable quantity of resin in the reservoir 55. It will also be noted from FIGURES 3 and 6 that the forming passage itself is provided in the forming device 26 within the member 63 which has an external cylindrical surface surrounded by the inner sleeve 60 and which has an internal opening of square or angular shape cooperating with the square part 27c of the structure 27 in order to define the forming passage for the shaping and formation of a tubular article of square shape, such article being indicated at P in FIGURE 6.

If it is desired, the core portion 27c of the structure 27 may be provided with heating means and also with cooling means in regions corresponding to the heating and cooling regions provided in the forming device 26, in the manner disclosed in the copending application above referred to. From FIGURE 7 it will be seen that the core portion 27c has an internal cylindrical bore in which annular cooling and heating canisters of the kind shown in my copending application Ser. No. 353,525, filed Mar. 20, 1964, now Patent 3,277,531, may be inserted. Such canisters may have cooling or heating media circulated therethrough, for instance by pipe connections entering the top of the structure 27, several such connections being shown at 27e at the top of FIGURE 2.

The entrance end portion of the forming passage is desirably flared to an enlarged inlet opening as indicated at 63a in FIGURE 3 in order to provide for compression of the impregnated reinforcements as they enter the forming passage.

The article is adapted to be drawn through the forming passage by means of a puller mechanism located below the forming device 26, this puller mechanism advantageously comprising a pair of crawler tread devices indicated generally at 64—64 (see FIGURE 1), each crawler tread carrying a series of gripper blocks 65 adapted to engage the solidified article as it is delivered from the discharge or lower end of the forming passage and, by frictional engagement with the article, pull the article out of the forming device. This pulling action is also relied upon to advance the envelope of impregnated reinforcements downwardly on the structure 27 and thus to advance the reinforcements from the cylindrical portion 27b through the transition portion 27d onto the squared portion 27c.

By providing a shaping and guiding structure 27 of the kind described above it is possible to wind various reinforcement elements upon the cylindrical portion 27b, without encountering the inconvenient acceleration and deceleration factors which would be encountered in the case of winding such reinforcement elements upon an angular device, such as the angular portion 27c, which conforms with the shape of the article desired to be made.

The foregoing makes possible convenient production of various shapes other than cylindrical shapes incorporating reinforcement elements extended or oriented not only lengthwise of the piece being made but also transversely thereof, i.e., peripherally of the wall in the case of an angular tubular article. A similar advantage is also obtainable in connection with the production of articles of various other shapes, for instance a tubular article of oval shape, or even a tubular article having the general shape of a channel piece or I-beam.

Similarly, it is possible according to the invention to produce various articles of solid section having reinforcement elements or fibers extended or oriented not only lengthwise of the article but also transversely thereof. This is accomplished according to the invention by tapering the reinforcement shaping structure to a point of termination at or upstream of the entrance end of the forming passage.

One example of this modification of the invention is illustrated in FIGURES 8 to 15 inclusive in which there is shown an arrangement for producing a solid section channel member. In this case a forming device is employed incorporating a pair of relatively separable parts 66 and 67, appropriately shaped so that when assembled with the spacer strips 68, a forming passage or cavity of channel shape is provided as indicated at 69 in FIGURE 15. The upper portions of members 66 and 67 are desirably provided with cavities for the circulation of a cooling medium, having connections 70.

Cavities having connections 71 are also provided for the circulation of a heating transfer medium in the lower portion of the forming device.

A reinforcement shaping and guiding structure 72 is also provided, the upper portion of this structure being cylindrical as in the first embodiment and being adapted to be associated with the reinforcement winding and impregnating mechanisms, for instance of the kind illustrated in FIGURE 1 and described above. Toward its lower end the structure 72 is progressively shaped to various different contours, initially to an oblong shape as indicated at 72a in FIGURE 12 and then to an oblong shape 72b having flanges 72c as shown in FIGURE 13, and finally to a channel shape comprising a channel web or base 72d and flanges 72e (see FIGURE 14).

Attention is now called to the fact that as seen particularly in FIGURE 10 the structure 72 is tapered to a point of termination just at the entrance end of the forming passage 69. Furthermore, as seen in FIGURES 8, 9, 10, 13 and 14, a guide shoe 73 is positioned to cooperate with the structure 72 and to cause the reinforcement to enter the re-entrant portion of the structure 72 between the progressively developing flanges 72c-72e.

The manner in which the reinforcement progressively changes shape in the arrangement of FIGURES 8 to 15 will appear quite clearly from comparison of FIGURES 11 to 15 from which it appears that the reinforcement originally laid upon the structure 72 in the form of a cylinder C changes first to the oblong shape C1 and then progressively assumes the channel shape through the stages indicated at C2 and C3 in FIGURES 13 and 14, being ultimately caused to take on the complete channel form of the forming passage 69, thereby providing for the production of a solid section channel.

With reinforcements laid upon the structure 72 in a manner to include at least some reinforcement elements which are wound helically upon that structure, for instance reinforcement strips or rovings or both, in the arrangement shown in FIGURE 1, the article formed will incorporate various reinforcement fibers extended transversely of the length of the channel being produced. In other words such a piece will have reinforcement fibers extended across the base or web of the channel and also crosswise of the flanges thereof. By combining such helically wound reinforcements with others which are fed to the structure 72 in an axial direction, it is possible to secure a channel member reinforced with both longitudinal and transverse fibers, and this provides an article of great strength.

Figure 18:
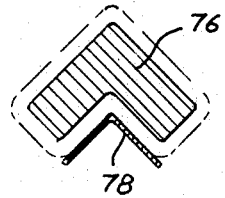
Figure 24:
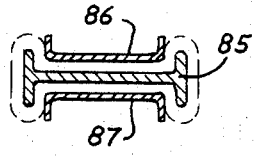
Figure 19:
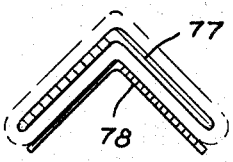
Figure 25:
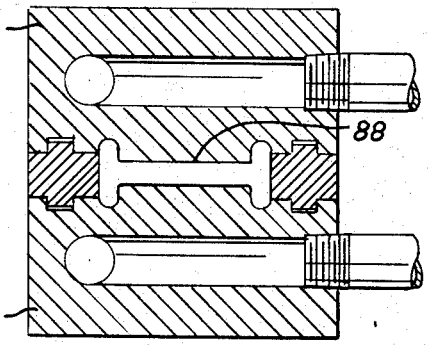
Figure 20:
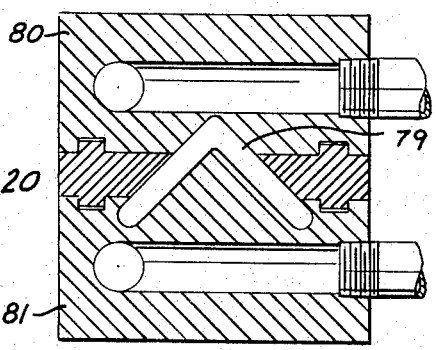

In connection with FIGURES 16 to 20 inclusive it is again noted that these figures correspond to FIGURES 11 to 15 inclusive, but illustrate the same general principles and structures applied to the making of a piece of angular shape, instead of the channel member produced in accordance with FIGURES 8 to 15. For this purpose a reinforcement shaping and guiding structure is employed having a cylindrical portion indicated at 74, and this progressively tapers or changes in shape to a square section as indicated at 75, and then to a thick flanged angle shape 76 as shown in FIGURE 18 and finally to a thin flanged angle shape 77 as shown in FIGURE 19. A guide shoe 78 positioned similarly to the guide shoe 73 shown in FIGURES 8, 9, 10, 13 and 14, is also employed in order to cause the reinforcement to conform with the shape of the re-entrant side of the structure 76 and 77, from which the reinforcement is of course delivered to the cavity 79 formed between the parts 80 and 81 of the forming device.

A similar series of FIGURES (21 to 25) inclusive illustrates the manner of employing the principles of the invention in the formation of a solid section I-beam. Here the shaping and guiding structure for the reinforcement again has the cylindrical shape in its upper portion as indicated at 82, then the shape changes progressively to an oblong 83, and from that shape to shape 84 having small flanges, and finally to the shape 85 in which the flanges are more fully developed in the manner of the I-beam to be made. In this case two guide shoes are provided, one at each side of the structure 84–85, such shoes being indicated at 86 and 87; and it is of course contemplated that these would again be positioned in the general manner indicated for guide shoe 73 in FIGURES 8, 9 and 10. Ultimately the formed reinforcement is delivered from the guide structures 85, 86 and 87 into the cavity 88 formed between the members 89 and 90 of the forming device. In this way a solid section I-beam is formed.

In connection with each of the embodiments shown respectively in FIGURES 8 to 15 inclusive, FIGURES 16 to 20 inclusive and FIGURES 21 to 25 inclusive, several factors are to be kept in mind including the fact that both the shaping and guiding elements, as well as the cooperating shoes are all terminated at the entrance end of the forming passage. In addition it is contemplated in each instance that the entrance end of the forming passage be flared to an enlarged inlet opening in order to provide for progressive compression of the reinforcement as it enters the portion of the forming passage conforming with the shape of the article to be made.

It will also be understood of course that in each instance it is contemplated that the reinforcement be impregnated with liquid heat hardenable resin, as in the first embodiment described, and this may be acomplished in the manner indicated in FIGURE 1 and described with reference to that figure.

In all three of the embodiments presented in FIGURES 8 to 25 inclusive, it is further contemplated that in each instance the peripheral dimension of the shaping and guiding structure for the reinforcement be maintained approximately the same throughout the length of that structure and from the region where the structure is cylindrical through the transition region to the ultimate shape thereof.

If desired, the reinforcement shaping and guiding structures for making various shapes such as those shown in FIGURES 8 to 25 inclusive may be extended through the forming device, in which event hollow, instead of solid section articles will be produced.

In connection with all of the embodiments herein illustrated and described, it should be kept in mind that the equipment need not necessarily be arranged vertically as in FIGURE 1. Insofar as concerns the distinctive features of this invention, the position of the equipment is not of significance.

I claim:

1. Apparatus for use in making a tubular article at least the inside of which is of angular cross section and composed of fiber reinforced resin material, comprising:
    (a) a forming device having a passage therethrough that has a cross sectional shape substantially corresponding to the external shape of the tubular article being made;
    (b) a core structure comprised of three portions, including:
        (i) a first cylindrical reinforcement guide portion coaxially disposed upstream of said forming device and having a circular cross section;
        (ii) a second non-cylindrical guide portion disposed within said forming device and spaced apart coaxially from said first portion, the perimetrical length of a cross section of said second portion being substantially equal to the length of the circumference of the circular cross section of said first portion, and
        (iii) a third transition portion interconnecting said first and second portions that gradually changes shape from the circular cross section of the first core portion to the angular cross section of said second core portion;
    (c) mechanism rotative about the axis of said second core portion for effecting winding of continuous fibrous reinforcements on said second core portion;
    (d) means for impregnating the fibrous reinforcement with a hardenable liquid resin substance;
    (e) means for solidifying said resin while said reinforcements are in said forming device to effect formation of tubular article; and
    (f) apparatus engageable with the article beyond said forming device to advance the wound reinforcement from the circular core second portion onto the transitional third portion, thence onto said angular first portion, and through said forming device.

2. Apparatus according to claim 1 in which successive cross sections throughout the transition portion of the core have substantially the same peripheral dimensions as that of the circular and angular portions of the core.

3. Apparatus according to claim 1 and further including additional mechanism for feeding another elongated fibrous reinforcement to the core in a position in which the length of the reinforcement is extended parallel to the length of the core, to be advanced along the core along with the wound reinforcement, thereby providing for making of an article of angular section having both axially extended and peripherally extended reinforcement elements.

4. Apparatus according to claim 1 and further including means for driving the reinforcement winding mechanism at a constant angular speed about the axis of the circular portion of the core.

5. A method for making continuous lengths of a fiber reinforced article of cross sectional shape other than cylindrical, comprising winding a fiber reinforcement in the form of a cylinder, advancing the reinforcement in its cylindrical form axially thereof and during such advancement changing the cross sectional shape generally to the shape of the article being made, impregnating the fiber reinforcement with a liquid heat hardenable resin material, feeding the impregnated and shaped reinforcement through a forming passage of cross sectional shape substantially conforming with that of the article being made, and heating the resin while it is being fed through the forming passage sufficiently to solidify the article in the forming passage.

6. Apparatus for use in making continuous lengths of a fiber reinforced article, comprising a forming device having a passage therethrough at least a portion of which is of cross sectional shape substantially conforming with the non-circular cross sectional shape of the article being made and through which reinforcement and liquid resin materials are passed and in which the resin material is solidified, a reinforcement shaping and guiding structure arranged upstream of the forming passage and including a cylindrical portion and a transition portion adapted to receive fiber reinforcements, a sleeve surrounding said structure and cooperating therewith to define an annular feed channel for delivering liquid resin material to the surface of said structure upstream of the forming passage, and means for laying fiber reinforcement on the resin wetted surface of said structure to impregnate the reinforcement and for feeding the impregnated reinforcement along said structure into and through the forming passage.

7. Apparatus according to claim 6 in which the portion of said structure surrounded by said sleeve is of smaller cross sectional dimension than the portion of said structure to which the resin is delivered, the sleeve and said structure being relatively movable axially to provide for variation of the size of the discharge end or orifice of the resin delivery passage.

8. A method for making continuous lengths of a fiber reinforced tubular article having a cross sectional shape other than annular, comprising the steps:
    (a) winding a fiber reinforcement on a cylindrical mandrel;
    (b) advancing the reinforcement in its cylindrical, annular form axially of the mandrel and during such advancement
        (i) changing the circular annular cross sectional shape to a shape other than circular annular;

(c) impregnating the fiber reinforcement with a liquid heat hardenable resin;
(d) advancing the resin-impregnated reinforcement through a forming passage having a cross sectional shape substantially corresponding to the shape of the article being formed; and
(e) heating the resin impregnated reinforcement while it is advancing through said forming passage to solidify the resin and form the article.

References Cited
UNITED STATES PATENTS

| | | | |
|---|---|---|---|
| 2,871,911 | 2/1959 | Goldsworthy et al. | 156—380 |
| 2,887,721 | 5/1959 | Blanchi et al. | 156—180 |
| 2,977,630 | 4/1961 | Bazler | 156—180 |

EARL M. BERGERT, *Primary Examiner.*

P. DIER, *Assistant Examiner.*

FO-1050
(5/69)

UNITED STATES PATENT OFFICE
CERTIFICATE OF CORRECTION

Patent No. 3,374,132            Dated March 19, 1968

Inventor(s) Le Roy R. Boggs

It is certified that error appears in the above-identified patent and that said Letters Patent are hereby corrected as shown below:

Col. 7, line 73, change "second", to --- first --- line 75, change "second", to --- first ---

Col. 8, line 8, delete "second"

line 10, change "first", to --- second ---

Signed and sealed this 17th day of August 1971.

(SEAL)
Attest:

EDWARD M. FLETCHER, JR.
Attesting Officer

WILLIAM E. SCHUYLER, JR.
Commissioner of Patents